United States Patent [19]

Chen et al.

[11] 3,852,189

[45] Dec. 3, 1974

[54] SHAPE-SELECTIVE CONVERSION IN THE LIQUID PHASE

[75] Inventors: Nai Y. Chen, Titusville; William E. Garwood, Haddonfield, both of N.J.

[73] Assignee: Mobil Oil Corporation, New York, N.Y.

[22] Filed: May 30, 1972

[21] Appl. No.: 257,729

Related U.S. Application Data

[63] Continuation-in-part of Ser. No. 94,569, Dec. 2, 1970, abandoned, which is a continuation-in-part of Ser. No. 865,470, Oct. 10, 1969, Pat. No. 3,700,585.

[52] U.S. Cl. .............. 208/120, 208/18, 252/455 Z
[51] Int. Cl. ...................... C10g 11/18, C01b 33/28
[58] Field of Search ............................ 208/120, 111

[56] References Cited
UNITED STATES PATENTS

| | | | |
|---|---|---|---|
| 3,039,953 | 6/1962 | Eng | 208/26 |
| 3,236,761 | 2/1966 | Rabo et al. | 208/111 |
| 3,275,571 | 9/1966 | Mattox | 252/451 |
| 3,277,018 | 10/1966 | Plank et al. | 252/451 |
| 3,294,858 | 12/1966 | Butler et al. | 260/683 |
| 3,308,069 | 3/1967 | Wadlinger et al. | 252/455 |
| 3,375,205 | 3/1968 | Wadlinger et al. | 252/455 |
| 3,379,640 | 4/1968 | Chen et al. | 208/111 |
| 3,385,781 | 5/1968 | Hamner et al. | 208/57 |
| 3,438,887 | 4/1969 | Morris et al. | 208/87 |
| 3,459,680 | 8/1969 | Plank et al. | 252/455 |
| 3,492,218 | 1/1970 | Collier et al. | 208/27 |
| 3,516,925 | 6/1970 | Lawrence et al. | 208/111 |
| 3,539,498 | 11/1970 | Morris et al. | 208/111 |
| 3,558,476 | 1/1971 | Robbins et al. | 208/120 |
| 3,575,846 | 4/1971 | Hamner et al. | 208/111 |
| 3,594,311 | 7/1971 | Frilette et al. | 208/111 |
| 3,607,043 | 9/1971 | McDaniel et al. | 423/328 |
| 3,700,585 | 10/1972 | Chen et al. | 208/111 |
| 3,758,402 | 9/1973 | Oleck et al. | 208/111 |
| 3,758,403 | 9/1973 | Rosinski et al. | 208/120 |

*Primary Examiner*—Delbert E. Gantz
*Assistant Examiner*—G. E. Schmitkons
*Attorney, Agent, or Firm*—A. L. Gaboriault

[57] ABSTRACT

Straight-chain hydrocarbons and slightly branched-chain hydrocarbons are selectively converted in the liquid phase utilizing novel crystalline zeolites having unique molecular sieving properties. The catalyst preferably contains acidic cations and can also contain a component having a hydrogenation/dehydrogenation function. The process of this invention is particularly useful for the shape selective dewaxing of hydrocarbon oils including removal of high freezing point paraffins from jet fuel to lower freezing point, improving the octane rating of naphtha fractions, and lowering the pour point of high pour stocks, all with long catalyst life.

4 Claims, No Drawings

SHAPE-SELECTIVE CONVERSION IN THE LIQUID PHASE

RELATION TO OTHER APPLICATIONS

This application is a continuation-in-part of Ser. No. 94,569, filed Dec. 2, 1970, and now abandoned, which is a continuation-in-part of Ser. No. 865,470 filed Oct. 10, 1969 which is now U.S. Pat. No. 3,700,585.

BACKGROUND OF THE INVENTION

1. Field of the Invention

This invention relates to novel hydrocarbon conversion liquid phase processes carried out in the presence of crystalline zeolite material and, more particularly, to the removal of straight-chain paraffins and slightly branched-chain paraffins from hydrocarbon feedstocks by selectively converting these materials from a mixture of the same with the other components generally found in hydrocarbon feedstocks in a liquid phase operation.

2. Description of the Prior Art

Hydrocarbon conversion processes utilizing crystalline zeolites and, in particular, aluminosilicate catalysts have been the subject of extensive investigation during recent years as is obvious from both the patent and scientific literature. Crystalline aluminosilicates have been found to be particularly effective for a wide variety of hydrocarbon conversion processes and have been described and claimed in many patents including U.S. Pat. No. 3,140,249; 3,140,252; 3,140,251; 3,140,253; and 3,271,418. Aside from serving as general catalysts in hydrocarbon conversion processes, it is also known that the molecular sieve properties of zeolites can be utilized to preferentially convert one molecular species from a mixture of the same with other species.

In a process of this type a zeolitic molecular sieve is employed having catalytic activity within its internal pore structure and pore openings such that one component of a feed is capable of entering within the internal pore structure thereof and being converted to the substantial exclusion of another component which, because of its size, is incapable of entering within the pores of the zeolitic material. Shape selective catalytic conversion is also known in the art and is disclosed and claimed in U.S. Pat. Nos. 3,140,322; 3,379,640 and 3,395,094.

Although a wide variety of zeolitic materials and particularly crystalline aluminosilicates have been successfully employed in various catalytic conversion processes, nevertheless, these prior art processes, in general, fell into one or two main categories. In one type of conversion process a zeolite was employed which had a pore size sufficiently large to admit the vast majority of components normally found in a charge, i.e., these materials are referred to as large pore size molecular sieves and they are generally stated to have a pore size of from 6 to 13 Angstroms and are represented by zeolites X, Y and L. The other type of aluminosilicate was one which had a pore size of approximately 5 Angstrom units and it was utilized to preferentially act upon normal paraffins to the substantial exclusion of other molecular species. Thus, by way of considerable oversimplification up until the present invention, there were only two types of aluminosilicates which where available for hydrocarbon processing — those which would admit only normal paraffins and those which would admit all components normally present in a hydrocarbon feed charge.

A part of this problem has been met by the invention disclosed in our copending application Ser. No. 865,470, filed Oct. 10, 1969 now U.S. Pat. No. 3,700,585, of the same assignee. Thus in the application, there is disclosed the use of a certain crystalline zeolitic material, more fully described hereinafter, for the selective conversion of straight chain and slightly branched-chain hydrocarbons, especially the dewaxing of these hydrocarbons to lower the freezing point and improve the octane rating of naphtha fractions. However, this process is operated either under vapor phase or partially vapor phase cracking conditions or under hydrocracking conditions, i.e., under a hydrogen pressure of 200 to 700 psig and in the presence of added hydrogen and a hydrogenation component.

In view of the rather severe conditions employed in our copending application, it is desirable to provide a process yielding comparable results but with less severe conditions. The process of the present invention meets these requirements.

Description of the Invention

It has now been discovered that very effective catalytic operations can be carried out by utilizing a class of zeolite molecular sieves which possess unique sieving properties in that they allow entry and egress to their internal pore structure of not only normal paraffins but also of slightly branched paraffins, and yet have the ability to exclude heavily branched isoparaffins. Further, it has been discovered that liquid phase hydrocarbon conversion processes which are not only selective towards normal paraffins, but also are selective towards slightly branched paraffins and, in particular, monomethyl-substituted paraffins, can be carried out under liquid phase conditions. It has now been discovered that when zeolitic materials exhibiting the properties disclosed herein are employed in the liquid phase operations disclosed, where it has been heretofore desirous only to selectively remove normal paraffins, that many increased and unexpected benefits occur in that the resulting products have enhanced economic value.

The novel hydrocarbon conversion process of this invention is predicated upon using zeolitic materials which can generally be stated to be intermediate between the two types of aluminosilicates heretofore employed. Thus, catalysts used in this invention will allow the entry into their internal pore structure of normal aliphatic compounds and slightly branched aliphatic compounds, particularly monomethyl-substituted compounds, yet substantially exclude all compounds containing at least a quaternary carbon atom or having a molecular dimension equal to or substantially greater than a quaternary carbon atom. Additionally, aromatic compounds having side chains similar to the normal aliphatic compounds and slightly branched aliphatic compounds above described could have said side chains enter the internal pore structure of the instant catalysts. Thus, if one were to measure the selectivity of the zeolitic materials employed in the processes of this invention by the heretofore mentioned prior art test, i.e., the ability to selectively crack hexane from a mixture of the same with isohexane, these catalysts would have to be stated as being non-shape selective. It should be immediately apparent, however, that the term selectivity has a far greater significance than merely the ability to preferentially distinguish between normal paraffins and isoparaffins. Selectivity on shape is theoretically possible at any shape or size although, quite obviously, such selectivity might not result in an advantageous catalyst for any and all hydrocarbon conversion processes.

The novel dewaxing processes of this invention are based upon the fact that, although it is art-recognized that in the vast majority of refinery operations it is desirous to remove normal paraffins, nevertheless, such a generalization is not the final word in obtaining maximum yields of economically enhanced products. It has now been discovered that enhanced benefits can be obtained if a catalyst system could be designed which would not only selectively convert normal paraffins, but certain isoparaffins, and yet not affect desirable components in a given feedstock. This type of molecular processing or sieving was heretofore unknown. As has been stated, all the previous catalytic processing involving the use of zeolitic molecular sieves merely gave the operator two choices. He could either use a molecular sieve which was a catalyst of generalized competence, i.e., it would act upon substantially all of the molecules normally found in a hydrocarbon feed or he could use a catalyst which had a pore size of about 5 Angstrom units thereby allowing selective conversion of normal aliphatic compounds only.

While not wishing to be bound by any theory of operation, nevertheless, it appears that the crystalline zeolitic materials employed in the instant invention cannot simply be characterized by the recitation of a pore size or a range of pore sizes. It would appear that the uniform pore openings of this new type of zeolite are not circular in nature, as is usually the case in the heretofore employed zeolites, but rather, are elliptical in nature. Thus, the pore openings of the instant zeolitic materials have both a major and a minor axes, and it is for this reason that the unusual and novel molecular sieving effects are achieved. This elliptical shape can be referred to as a "keyhole." It would appear that the minor axis of the elliptical pores in the zeolites apparently have an effective size of about 5.5 Angstrom units. The major axis appears to lie somewhere between 6 and about 9 Angstrom units. The unique keyhole molecular sieving action of these materials is presumably due to the presence of these elliptically shaped windows controlling access to the internal crystalline pore structure.

A test method has been devised in order to determine whether or not a zeolite possesses the unique molecular sieving properties necessary to carry out the novel conversion process of this invention. In said test method a candidate zeolite free from any matrix or binder is initially converted to the so-called acid or hydrogen form. This procedure involves exhaustive exchange with an ammonium chloride solution in order to replace any metallic cations originally present. The sample is then sized to 20–30 mesh and calcined in air for 16 hours at 550°C. One gram of the so-treated zeolite is then contacted with benzene at a pressure of 12 torr at a temperature of 25°C for a time period of 2 hours. Another gram sample is contacted with mesitylene at a pressure of 0.5 torr at a temperature of 25°C for a period of 6 hours. An operable zeolite is one whose acid form will adsorb at least 3.0 weight percent benzene and less than 1.5 weight percent mesitylene at the above recited conditions.

Examples of zeolitic materials which are operable in the process of this invention are ZSM-5 type and ZSM-8 type zeolites. ZSM-5 type materials are disclosed and claimed in copending application Ser. No. 865,472, filed Oct. 10, 1969 now U.S. Pat. No. 3,702,886 and ZSM-8 is disclosed and claimed in copending application Ser. No. 865,418, filed Oct. 10, 1969. These zeolitic materials are more fully described hereinafter.

As has heretofore been pointed out, the novel process of this invention is concerned with dewaxing of hydrocarbon feedstocks in the liquid phase. The term "dewaxing," as used in the specification and claims, is used in its broadest sense and is intended to mean the removal of those hydrocarbons which readily solidify (waxes) from petroleum stocks. Hydrocarbon feeds which can be treated include lubricating oil stocks as well as those which have a freeze point or pour point problem, i.e., petroleum stocks boiling above about 350°F.

The attractiveness of the novel process of the invention is that it can be carried out under the rather moderate conditions of a liquid phase operation. Thus, this process is conducted at a temperature in the range of about 400° to 900°F., preferably about 500° to 740°F., and a pressure sufficient to maintain the liquid phase. A preferred range of pressure is about 100 to 3,000 psig, preferably about 400 to 800 psig. Space velocities generally are in the range of 0.1–100 equivalent weights of oil per weight of catalyst per hour (w./hr./w.).

In the process of the invention it has been found that use of the zeolitic catalysts described above for the conversion of hydrocarbons under liquid phase reaction conditions provides excellent results for the conversion of high pour petroleum stocks to low pour stocks. This can be accomplished in the present invention without the necessity of hydrogen as generally required in hydrocracking operations. These are especially attractive features when added to the overall economy of the process.

In addition, however, compared to conventional vapor phase cracking processes, the catalyst remains active under liquid phase conditions for a substantially longer time, i.e., in the neighborhood of one month, before regeneration becomes necessary.

In fact, over 900 to 1,100 pounds of oil have been processed per pound of catalyst before regeneration becomes necessary. At 1WHSV operation, this could mean that regeneration would not be necessary for at least 900 to 1,100 hours on stream or about 1.2 to 1.5 months of continuous operation.

The process can be carried out in a convenient manner since hydrogen need not be fed and the reaction conditions are only those necessary to maintain the liquid phase. Thus the apparatus may comprise either a single fixed bed reactor operating in a cyclic fashion of cracking, stripping and regeneration, or a number of reactors could be operated cyclically with maintenance of a constant throughput. For heavy vacuum gas oils and residual stocks, a liquid fluidized bed operation with slow catalyst addition and withdrawal is preferred. The process in general should not be limited only to shape selective processes, and could indeed be extended to other liquid phase cracking processes when large pore high $SiO_2/Al_2O_3$ zeolites are used. However, the same catalyst operating in the conventional vapor phase cracking temperature range of 850°–1,000°F. would deactivate much more rapidly than operating in the liquid phase. Our present theory states that high silica/alumina zeolites are hydrophobic in nature, do not preferentially adsorb unsaturated and polar molecules, i.e., coke precursors, and when the zeolite is used in liquid phase operation, these unsaturated coke precursors are easily desorbed and washed away by the reactor effluent before further condensation takes place to form "coke" within the intracrystalline cavities. However, we do not wish to be bound by this theory.

The simplicity of this reaction system for pour point lowering makes it attractive for a number of applications at any refinery, but particularly where hydrogen is not available for hydrodewaxing or a catalytic cracker is not already installed. For example, high pour stocks to be pipelined could be processed at their source using this invention.

The zeolitic catalyst employed in the invention will now be more fully described.

The family of ZSM–5 compositions has the characteristic X-ray diffraction pattern set forth in Table 1, hereinbelow. ZSM–5 compositions can also be identified, in terms of mole ratios of oxides, as follows:

$$0.9 \pm 0.2\ M_{2/n}O : W_2O_3 : 5\text{--}100\ YO_2 : zH_2O$$

wherein M is a cation, $n$ is the valence of said cation, W is selected from the group consisting of aluminum and gallium, Y is selected from the group consisting of silicon and germanium, and Z is from 0 to 40. In a preferred synthesized form, the zeolite has a formula, in terms of mole ratios of oxides, as follows:

$$0.9 \pm 0.2\ M_{2/n}O : Al_2O_3 : 5\text{--}100\ SiO_2 : z\ H_2O$$

and M is selected from the group consisting of a mixture of alkali metal cations, especially sodium, and tetraalkylammonium cations, the alkyl groups of which preferably contain 2–5 carbon atoms.

In a preferred embodiment of ZSM–5, W is aluminum, Y is silicon and the silica/alumina mole ratio is at least 10 and ranges up to about 60.

Members of the family of ZSM–5 zeolites possess a definite distinguishing crystalline structure whose X-ray diffraction pattern shows the following significant lines:

TABLE I

| Interplanar Spacing d(A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities 100 I/I, where I is the intensity of positions as a function of 2 times theta, where theta is the Bragg angle, were read from the spectrometer chart. From these, the relative intensities, 100 I/I, where I is the intensity of the strongest line or peak, and $d$ (obs.), the interplanar spacing in A, corresponding to the recorded lines, were calculated. In Table I the relative intensities are given in terms of the symbols S = strong, M = medium, MS = medium strong, MW = medium weak and VS = very strong. It should be understood that this X-ray diffraction pattern is characteristic of all the species of ZSM–5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM–5 have been prepared. X-ray powder diffraction patterns of several of these forms are set forth below. The ZSM–5 forms set forth below are all aluminosilicates.

TABLE 2

X-Ray Diffraction
ZSM-5 Powder in Cation Exchanged Forms
d Spacings Observed

| As Made | HCl | NaCl | CaCl$_2$ | ReCl$_3$ | AgNO$_3$ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| — | — | 9.01 | 9.02 | — | 8.99 |
| 8.06 | — | — | — | — | — |
| 7.44 | 7.46 | 7.46 | 7.46 | 7.40 | 7.46 |
| 7.08 | 7.07 | 7.09 | 7.11 | — | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 | — | 5.38 | 5.37 | 5.38 | 5.37 |
| 5.13 | 5.11 | 5.14 | 5.12 | 5.14 | — |
| 4.99 | 5.01 | 5.01 | 5.01 | 5.01 | 5.01 |
| — | — | 4.74 | — | — | — |
| 4.61 | 4.62 | 4.62 | 4.61 | 4.63 | 4.62 |
| — | — | 4.46 | 4.46 | — | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | — | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| — | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 | — | — | 3.17 | 3.18 | — |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| — | — | — | — | 2.97 | — |
| — | 2.95 | 2.95 | 2.94 | 2.95 | 2.95 |
| 2.86 | 2.87 | 2.87 | 2.87 | 2.87 | 2.87 |
| 2.80 | — | — | — | — | — |
| 2.78 | — | — | 2.78 | — | 2.78 |
| 2.73 | 2.74 | 2.74 | 2.73 | 2.74 | 2.74 |
| 2.67 | — | — | 2.68 | — | — |
| 2.66 | — | — | 2.65 | — | — |
| 2.60 | 2.61 | 2.61 | 2.61 | 2.61 | 2.61 |

TABLE 2-Continued

X-Ray Diffraction
ZSM-5 Powder in Cation Exchanged Forms
d Spacings Observed

| As Made | HCl | NaCl | CaCl$_2$ | ReCl$_3$ | AgNO$_3$ |
|---|---|---|---|---|---|
| — | 2.59 | — | 2.59 | — | — |
| 2.57 | — | 2.57 | 2.56 | — | 2.57 |
| 2.50 | 2.52 | 2.52 | 2.52 | 2.52 | — |
| 2.49 | 2.49 | 2.49 | 2.49 | 2.49 | 2.49 |
| — | — | — | 2.45 | — | — |
| 2.41 | 2.42 | 2.42 | 2.42 | 2.42 | — |
| 2.39 | 2.40 | 2.40 | 2.39 | 2.40 | 2.40 |
| — | — | — | 2.38 | 2.35 | 2.38 |
| — | 2.33 | — | 2.33 | 2.32 | 2.33 |
| — | 2.30 | — | — | — | — |
| — | 2.24 | 2.23 | 2.23 | — | — |
| — | 2.20 | 2.21 | 2.20 | 2.20 | — |
| — | 2.18 | 2.18 | — | — | — |
| — | — | 2.17 | 2.17 | — | — |
| — | 2.13 | — | 2.13 | — | — |
| — | 2.11 | 2.11 | — | 2.11 | — |
| — | — | — | 2.10 | 2.10 | — |
| — | 2.08 | 2.08 | — | 2.08 | 2.08 |
| — | — | 2.07 | 2.07 | — | — |
| — | — | — | 2.04 | — | — |
| 2.01 | 2.01 | 2.01 | 2.01 | 2.01 | 2.01 |
| 1.99 | 2.00 | 1.99 | 1.99 | 1.99 | 1.99 |
| — | — | — | 1.97 | 1.96 | — |
| 1.95 | 1.95 | 1.95 | 1.95 | 1.95 | — |
| — | — | — | — | 1.94 | — |
| — | 1.92 | 1.92 | 1.92 | 1.92 | 1.92 |
| 1.91 | — | — | — | 1.91 | — |
| — | — | — | — | 1.88 | — |
| 1.87 | 1.87 | 1.87 | 1.87 | 1.87 | 1.87 |
| — | 1.86 | — | — | — | — |
| 1.84 | 1.84 | — | — | 1.84 | 1.84 |
| 1.83 | 1.83 | 1.83 | 1.83 | 1.83 | — |
| 1.82 | — | 1.81 | — | 1.82 | — |
| 1.77 | 1.77 | 1.79 | 1.78 | — | 1.77 |
| 1.76 | 1.76 | 1.76 | 1.76 | 1.76 | 1.76 |
| — | — | 1.75 | — | — | 1.75 |
| — | 1.74 | 1.74 | 1.73 | — | — |
| 1.71 | 1.72 | 1.72 | 1.71 | — | 1.70 |
| 1.67 | 1.67 | 1.67 | — | 1.67 | 1.67 |
| 1.66 | 1.66 | — | 1.66 | 1.66 | 1.66 |
| — | — | 1.65 | 1.65 | — | — |
| — | — | 1.64 | 1.64 | — | — |
| — | 1.63 | 1.63 | 1.63 | 1.63 | 1.62 |
| — | 1.61 | 1.61 | 1.61 | — | 1.61 |
| 1.58 | — | — | — | — | — |
| — | 1.57 | 1.57 | — | 1.57 | 1.57 |
| — | — | 1.56 | 1.56 | 1.56 | — |

Zeolite ZSM-5 can be suitably prepared by preparing a solution containing tetrapropyl ammonium hydroxide, sodium oxide, an oxide of aluminum or gallium, an oxide of silica or germanium, and water and having a composition, in terms of mole ratios of oxides, falling within the following ranges:

TABLE 3

|  | Broad | Preferred | Particularly Preferred |
|---|---|---|---|
| OH$^-$/SiO | 0.07–1.0 | 0.1–0.8 | 0.2–0.75 |
| R$_4$N+/(R$_4$N$^+$+Na$^+$) | 0.2–0.95 | 0.3–0.9 | 0.4–0.9 |
| H$_2$O/OH$^-$ | 10–300 | 10–300 | 10–300 |
| YO$_2$/W$_2$O$_3$ | 5–100 | 10–60 | 10–40 | where R is propyl, W is aluminum or gallium and Y is silicon or germanium maintaining the mixture until crystals of the zeolite are formed. Thereafter, the crystals are separated from the liquid and recovered. Typical reaction conditions consist of heating the foregoing reaction mixture to a temperature of from about 150°C to 175°C for a period of time of from about 6 hours to 60 days. A more preferred temperature range is from about 160° to 175°C with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230°F, for from about 8 to 24 hours. Of course, milder conditions may be employed if desired, e.g., room temperature under vacuum.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can be identified, in terms of mole ratios of oxides, as follows:

$$0.9 \pm 0.2\ M_{2/n}O : Al_2O_3 : 5\text{–}100\ SiO_2 : z\ H_2O$$

where M is at least one cation, n is the valence thereof and z is from 0 to 40. In a preferred synthesized form, the zeolite has a formula, in terms of mole ratios of oxides, as follows:

$$0.9 \pm 0.2\ M_{2/n}O : Al_2O_3 : 10\text{–}60\ SiO_2 : z\ H_2O$$

and M is selected from the group consisting of a mixture of alkali metal cations, especially sodium, and tetraethylammonium cations.

ZSM-8 possesses a definite distinguishing crystalline structure having the following X-ray diffraction pattern:

TABLE 4

| dA° | I/I$_o$ | I/I$_o$ | dA° |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 5 | 3 | 2.61 |
| 6.35 | 12 | 1 | 2.57 |
| 6.04 | 6 | 1 | 2.55 |
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |

TABLE 4-Continued

| dA° | I/I₀ | I/I₀ | dA° |
|---|---|---|---|
| 3.59 | 2 | 2 | 1.95 |
| 3.47 | 6 | 2 | 1.91 |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM-8 can be suitably prepared by reacting a solution containing either tetraethylammonium hydroxide or tetraethylammonium bromide together with sodium oxide, aluminum oxide, and an oxide of silica and water.

The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range $SiO_2/Al_2O_3$ — from about 10 to about 200

$Na_2O$/tetraethylammonium hydroxide — from about 0.05 to 0.20

Tetraethylammonium hydroxide/$SiO_2$ — from about 0.08 to 1.0

$H_2O$/tetraethylammonium hydroxide — from about 80 to about 200

Thereafter, the crystals are separated from the liquid and recovered. Typical reaction conditions consist of heating the foregoing reaction mixture to a temperature of from about 100°C to 175°C for a period of time of from about 6 hours to 60 days. A more preferred temperature range is from about 150° to 175°C with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230°F, for from about 8 to 24 hours. Of course, milder conditions may be employed if desired, e.g., room temperature under vacuum.

ZSM-8 is prepared utilizing materials which supply the appropriate oxide. Such compositions include sodium aluminate, alumina, sodium silicate, silica hydrosol, silica gel, silicic acid, sodium hydroxide and tetraethylammonium hydroxide. It will be understood that each oxide component utilized in the reaction mixture can be supplied by one or more initial reactants and they can be mixed together in any order. For example, sodium oxide can be supplied by an aqueous solution of sodium hydroxide, or by an aqueous solution of sodium silicate, tetraethylammonium cation can be supplied by the bromide salt. The reaction mixture can be prepared either batchwise or continuously.

The zeolites used in the instant invention can have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolites are then preferably washed with water and dried at a temperature ranging from 150°F. to about 600°F. and thereafter calcined in air or other inert gas at temperatures ranging from about 500°F. to 1,500°F. for periods of time ranging from 1 to 48 hours or more. It has been further found in accordance with the invention that catalysts of improved selectivity and having other beneficial properties in some hydrocarbon conversion processes such as catalytic cracking are obtained by subjecting the zeolite to treatment with steam at elevated temperatures ranging from 800°F. to 1,500°F. and preferably 1,000°F. and 1,400°F. The treatment may be accomplished in atmospheres of 100 percent steam of an atmosphere consisting of steam and a gas which is substantially inert to the zeolites.

A similar treatment can be accomplished at lower temperatures and elevated pressures, e.g., 350°–700°F. at 10 to about 200 atmospheres.

Prior to use, the zeolites should be dehydrated at least partially. This can be done by heating to a temperature in the range of 200° to 600°C. in an inert atmosphere, such as air, nitrogen, etc. and at atmospheric or subatmospheric pressures for between 1 and 48 hours. Dehydration can also be performed at lower temperatures merely by using a vacuum, but a longer time is required to obtain a sufficient amount of dehydration.

The following working examples are presented to illustrate certain specific embodiments of the invention.

EXAMPLE 1

This example will illustrate a typical preparation of zeolite ZSM-5. 22.9 grams $SiO_2$ was partially dissolved in 100 ml 2.18N tetrapropylammonium hydroxide by heating to a temperature of about 100°C. There was then added a mixture of 3.19 grams $NaAlO_2$ (comp: 42.0 Wt. % $Al_2O_3$, 30.9% $Na_2O$, 27.1% $H_2O$) dissolved in 53.8 ml $H_2O$. The resultant mixture had the following composition: 0.382 mole $SiO_2$, 0.0131 mole $Al_2O_3$, 0.0159 mole $Na_2O$, 0.118 mole $[(CH_3CH_2CH_2)_4N]_2O$, 6.30 moles $H_2O$. The mixture was placed in a pyrex-lined autoclave and heated at 150°C. for 6 days. The resultant solid product was cooled to room temperature, removed, filtered, washed with 1 liter $H_2O$ and dried at 230°F. A portion of this product was calcined at 1,000°F. in air for 16 hours and the following analyses were obtained:

TABLE 4

| | | | |
|---|---|---|---|
| Wt. % $SiO_2$ | 93.62 | Wt. % n-Hexane adsorbed | 10.87 |
| Wt. % $Al_2O_3$ | 4.9 | Wt. % Cyclohexane adsorbed | 3.60 |
| Wt. % $Na_2O$ | 1.48 | Wt. % $H_2O$ adsorbed | 9.15 |
| Total | 100.00 | | |
| $SiO_2/Al_2O_3$ | 32.5 | | |
| $Na_2O/Al_2O_3$ | 0.5 | | |

EXAMPLE 2

The ZSM-5 of Example 1 was converted to the hydrogen form, i.e., H–ZSM–5 by base exchange with ammonium chloride followed by washing with water, drying and calcining at 1,000°F.

This example confirms that the H–ZSM–5 catalyst has sustained activity for shape selective liquid phase cracking of Amal-Nafoora gas oil (450°–630°F, + 25°F pour) without use of hydrogen and provides substantial pour point lowering. A total of 1,100 lbs. gas oil/lb. of H–ZSM–5 was processed continuously at 4–8 LHSV, 750 psig, 600°–800°F, reducing pour of the topped product to as low as −35°F at 20–25 percent conversion. When the test was terminated pour point of the liquid product was −5°F, conversion 17 weight percent.

Charge Stock

The charge stock was an Amal-Nafoora light gas oil with properties as follows:

| | |
|---|---|
| Gravity, °API | 38.1 |
| Pour Point, °F. | +25 |
| Aniline No., °F. | 171.6 |
| Diesel Index | 65 |
| Sulfur, Wt. % | 0.36 |
| ASTM Distillation: | |
| IBP, °F. | 452 |
| 5% | 500 |
| 10 | 520 |
| 20 | 536 |
| 30 | 545 |
| 40 | 551 |
| 50 | 560 |
| 60 | 566 |
| 70 | 573 |
| 80 | 582 |
| 90 | 595 |
| E. P. | 627 |
| % Rec. | 990 |
| Bromine No. | 0.1 |
| Aromatics, Wt. %* | 16.9 |

*By silica gel percolation.

Log of Run (750 psig)

| Accumulative Time, Hrs. | LHSV | Temp., °F. Average | Conv., Wt. % | Liquid Product Wt. % of Charge | Liquid Product Pour °F. | Topped Product Pour, °F. |
|---|---|---|---|---|---|---|
| 4 | 8 | 600 | 22.5 | 97 | −25 | − 5 |
| 8 | 4 | 610 | 24.3 | 96 | −30 | −15 |
| 25½ | do. | 636 | 23.5 | 95 | −50 | −35 |
| 49 | do. | 630 | 13.5 | 97 | − 5 | +15 |
| 73 | do. | 703 | 20.4 | 98 | −35 | −15 |
| 97 | do. | 701 | 16.0 | 98 | −10 | + 5 |
| 121 | do. | 750 | 29.4 | 93 | −60 | <−35 |
| 145 | do. | 754 | 24.1 | 96 | −35 | — |
| 169 | do. | 755 | 21.8 | 96 | −25 | — |
| 193 | do. | 755 | 20.5 | 96 | −10 | − 5 |

The pressure of 750 psig. is more than enough to keep the charge liquid phase; for example, a hydrocarbon boiling at 400°F. has a vapor pressure of about 500 psig at 800°F.

Yields and Properties

Characteristic yields are represented by the following material balances:

| Time on stream, hrs | 8–25½ | 75–97 | 99–121 | 169–193 |
|---|---|---|---|---|
| Temperature °F | 636 | 701 | 750 | 755 |
| Conv., Wt. % | 23.5 | 16.0 | 29.3 | 20.5 |
| Material Balance, Wt % | 97.4 | 99.7 | 100.4 | 99.0 |
| Yields, Wt % | | | | |
| $C_1$ | <0.1 | <0.1 | 0.1 | 0.2 |
| $C_2$ | 0.1 | 0.1 | 0.3 | 0.4 |
| $C_3$ | 2.5 | 1.6 | 4.1 | 1.6 |
| $C_4$ | 4.2 | 2.3 | 5.9 | 2.8 |
| $C_5^+$ Naphtha | 16.8 | 12.0 | 18.9 | 15.5 |
| Uncracked | 76.4 | 84.0 | 70.7 | 79.5 |
| | 100.0 | 100.0 | 100.0 | 100.0 |

The production of undesirable $C_1$'s and $C_2$'s is thus quite small; based on percent of cracked products $C_1$ is 1 percent or less, $C_2$'s 1–2 percent, $C_3$'s 8–14 percent, $C_4$'s 14–21 percent, and $C_5^+$ naphtha 64–75 percent in the examples shown.

Plot of pour point of the topped products versus conversion showed an average of about 1°F. pour lowering per percent conversion for the first 20 percent conversion, then 9°F. per percent conversion for the 5 percent conversion. This sudden and dramatic drop is characteristic also of catalytic cracking and hydrodewaxing over ZSM-5.

Characteristics observed for the ZSM-5 shape selective liquid phase cracking are:

1. The relationship between pour point lowering and yield loss is similar to that observed in hydrodewaxing, i.e., about 1°F., pour point lowering per percent yield loss for the first 20 percent conversion, then 9°F., pour point lowering per percent yield loss.
2. Among the lighter boiling cracked products the primary product (65–75 percent) was $C_5^+$ naphtha, and $C_1$'s + $C_2$'s are less than 3 percent.
3. Olefin contents of the uncracked (4 percent) and cracked (20 percent) products are higher than in hydrodewaxing over Zn/H–ZSM–5.
4. Aromatic and naphthenic content of the low pour product is proportionately higher than the charge.

EXAMPLE 3

A ZSM-5 zeolite was prepared as follows:

Solution A was made by dissolving 0.56 pounds of sodium aluminate (44.7% $Al_2O_3$) in 14.00 pounds of water. Solution B was made by dissolving 44.70 pounds of sodium silicate (28.5 weight percent $SiO_2$, 8.8 weight percent $Na_2O$, balance water) in 56.00 pounds of water. Solution C was made by dissolving 5.60 pounds of tetra-n-propylammonium bromide in 28.00 pounds of water. Solution D was made by dissolving 4.47 pounds of $H_2SO_4$ (97 weight percent) in 14.00 pounds of water. Solution C was poured into solution B while stirring. Solution A was then poured into the mixture of C and B while stirring. Solution D was then poured into the mixture of C, B and A while stirring. A firm gel was formed which was partially broken up by agitation with a stirrer and paddles. pH was 9.8. The reaction mixture was then stirred at 200°–210°F for 167 hours. The solid product was then separated from its mother liquor, washed substantially free of chloride ions, and over-dried at 230°F. The dried material was identified as 90 percent crystalline ZSM-5 by X-ray. It was then calcined for 10 hours in air at 1,000°F. A portion of the calcined material (303.2 grams) was base exchanged at room temperature by four one-hour contacts, each of which was with 303.2 grams NH₄Cl dissolved in 5,760 cc of water. The product was separated from its mother liquor, washed substantially free of chloride ions, dried at 230°F to give a product containing 92.4 weight percent solids having a sodium content of 0.1–0.2 weight percent. A portion of the dried product (27.6 grams) was mixed in a muller mixer for 20 minutes. To the mixer was added 8.22 grams of (Continental Oil Company) $Al_2O_3$ (mostly alpha-monohydrate, 77.6 weight percent solids). After 20 minutes of mixing, a solution of 0.319 grams of acetic acid in 3.19 grams of water was added to the mixer. After 10 minutes of mixing, 22.0 grams of water was added to the mixer during a period of half-an-hour. After half-an-hour's further mixing, the resulting material was extruded in an hydraulic extruder with 12 tons load to product one-sixteenth inch diameter extrudate in one pass. The extrudate was then dried for 3 hours at 230°F, and calcined in air by heating to 1,000°F at 2°F/minute followed by 10 hours at 1,000°F.

EXAMPLE 4

The H-ZSM-5 zeolite prepared according to Example 3 was evaluated for sustained catalytic properties by processing a straight run distillate over said catalyst for 30 continuous days without regeneration. This experiment vividly demonstrates the outstanding catalytic activity of the ZSM-5 type zeolites in liquid phase operations.

The charge stock employed was a straight run distillate from Amal crude having the following properties:

| | |
|---|---|
| Gravity, °API | 38.9 |
| Gravity, Specific | 0.8304 |
| Pour Point, °F | +50 |
| Distillation, ASTM, °F | |
| IBP | 455 |
| 5% | 509 |
| 10 | 541 |
| 30 | 579 |
| 50 | 600 |
| 70 | 622 |
| 90 | 660 |
| E.P. | 695 |
| % Residue | 2.0 |
| Sulfur, Wt. % | 0.10 |
| Aniline No., °F | 189.2 |
| Diesel Index | 74 |
| Aromatics, Wt. % (SiO Gel) | 13.8 |
| Bromine No. | 0.2 |

The entire 30-day run was carried out at 750 psig which was sufficient to maintain a liquid phase operation.

Additional operating conditions, as well as the results obtained are shown in the following table:

| Days | Conditions Temp., °F | LHSV[1] | Conversion Wt. % | Liquid Rec., Wt. % | Pour Point °F Liquid Product | Pour Point °F Topped Product | Diesel Index Topped Product |
|---|---|---|---|---|---|---|---|
| ⅔ | 583 (to 650) | 4 | 26.1 | 94.6 | +15 | +25 | 64.9 |
| 1⅔ | 648 (to 750) | 4 | 31.6 | 93.1 | +5 | +15 | 62.2 |
| 2 | 750 | 4 | 39.4 | 89.7 | −65 | −30 | — |
| 4 | 748 | 4 | 38.5 | 92.4 | −35 | −15 | 55.9 |
| 4¾ | 750 | 4 | 39.5 | 90.7 | −35 | −20 | 56.3 |
| 5¾ | 751 | 4 | 37.1 | 92.7 | −25 | 0 | 57.9 |
| 6¾ | 751 | 4 | 35.4 | 94.2 | −15 | +5 | 59.9 |
| 8¾ | 751 | 4 | 32.0 | 94.8 | 0 | +20 | 62.9 |
| 11¾ | 753 | 4 | 32.3 | 91.3 | +15 | +25 | 63.6 |
| 12¾ | (to 775) | — | — | — | — | — | — |
| 14½ | 775 | 4 | 33.0 | 95.1 | +10 | +25 | 62.8 |
| 19½ | 776 | 4 (to 2) | 29.9 | 94.9 | +20 | +35 | 65.6 |
| 20½ | 779 | 2 | 40.0 | 91.0 | 0 | +20 | 59.4 |
| 24½ | 782 | 2 | 36.0 | 92.8 | 0 | +25 | 62.2 |
| 25½ | 780 | 2(to 1) | 35.5 | 92.6 | +20 | +35 | 62.9 |
| 26½ | 780 | 0.9 | 46.3 | 87.0 | −15 | +25 | 53.6 |
| 28½ | 781 (to 800) | 1.1 | 36.4 | 92.7 | +15 | — | — |

[1] Based on H-ZSM-5 content of catalyst (80%)

After the first day on-stream conversion was kept at about 30–40 percent by raising temperature from 750° to 800°F and lowering space velocity from 4 to 1. The catalyst "aged" with respect to conversion until a temperature of 800°F and LHSV of 1 were reached. Conversion then remained essentially constant at 37–40 weight percent for 30 days.

Pour point lowering was greater than 40°F for the first week on-stream (during which time 670 vols oil had been passed over the catalyst). Lowering was then kept at 25°–30°F for the next 3 weeks by raising temperature to 780°F and lowering LHSV to 1 (an additional 1,560 vols oil per volume of catalyst). Finally at 800°F and 1 LHSV, lowering was essentially constant (along with conversion) at 15°F for 30 days.

What is claimed is:

1. A process for dewaxing petroleum charge stocks boiling above 350°F which comprises contacting said charge in the absence of added hydrogen and at a temperature of 400°–900°F and a pressure sufficient to maintain said charge in the liquid phase, said pressure ranging from about 100–3,000 psig with a crystalline aluminosilicate zeolite having an X-ray diffraction pattern set forth in Table 1 so as to selectively crack straight-chain hydrocarbons and branched-chain hydrocarbons free from quaternary carbon atoms in their structure, said aluminosilicate having a composition, in terms of oxide mol ratios as follows:

$$0.9 \pm 0.2\ M_{2/n}O : Al_2O_3 : 5 - 100\ SiO_2 : z\ H_2O$$

wherein M is a cation, $n$ is the valence of said cation and $z$ is from 0 to 40.

2. The process of claim 1 wherein the zeolite has been base exchanged with ammonium ions, hydrogen ions, metal ions or mixtures thereof.

3. A process for dewaxing petroleum charge stocks boiling above 350°F which comprises contacting said charge in the absence of added hydrogen and at a temperature of 400°–900°F and a pressure sufficient to maintain said charge in the liquid phase, said pressure ranging from about 100–3,000 psig with a crystalline aluminosilicate zeolite having an X-ray diffraction pattern set forth in Table 4 so as to selectively crack straight-chain hydrocarbons and branched-chain hydrocarbons free from quaternary carbon atoms in their structure, said aluminosilicate having a composition, in terms of oxide mol ratios as follows:

$$0.9 \pm 0.2\ M_{2/n}O: Al_2O_3 : 5\text{-}100\ SiO_2 : z\ H_2O$$

wherein M is a cation, $n$ is the valence of said cation and $z$ is from 0 to 40.

4. The process of claim 3 wherein the zeolite has been base exchanged with ammonium ions, hydrogen ions, metal ions or mixtures thereof.

* * * * *